United States Patent
Allen

(10) Patent No.: US 9,633,073 B1
(45) Date of Patent: Apr. 25, 2017

(54) DISTRIBUTED DATA STORE FOR HIERARCHICAL DATA

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 358 days.

(21) Appl. No.: 14/223,760

(22) Filed: Mar. 24, 2014

(51) Int. Cl.
*G06F 17/30* (2006.01)

(52) U.S. Cl.
CPC .. *G06F 17/30424* (2013.01); *G06F 17/30315* (2013.01); *G06F 17/30536* (2013.01)

(58) Field of Classification Search
CPC ......... G06F 17/30424; G06F 17/30445; G06F 17/30448; G06F 17/0469; G06F 17/30474; G06F 17/30315; G06F 17/30536
See application file for complete search history.

(56) References Cited

U.S. PATENT DOCUMENTS

| | | | |
|---|---|---|---|
| 2003/0028509 A1* | 2/2003 | Sah | G06F 17/30595 |
| 2009/0240663 A1* | 9/2009 | Plattner | G06F 17/30592 |
| 2010/0011031 A1* | 1/2010 | Huang | G06F 21/552 707/E17.007 |
| 2011/0219020 A1* | 9/2011 | Oks | G06F 17/30 707/769 |
| 2012/0191696 A1* | 7/2012 | Renkes | G06F 17/30336 707/714 |
| 2013/0159248 A1* | 6/2013 | Mueller | G06F 17/30 707/609 |
| 2013/0262436 A1* | 10/2013 | Barsness | G06F 17/30463 707/718 |
| 2015/0012507 A1* | 1/2015 | Fallon | H04N 9/8042 707/693 |
| 2015/0032763 A1* | 1/2015 | Marwah | G06F 17/30477 707/754 |
| 2015/0074066 A1* | 3/2015 | Li | G06F 17/30315 707/693 |
| 2015/0089523 A1* | 3/2015 | Volovich | H04N 21/23103 725/14 |

\* cited by examiner

*Primary Examiner* — Robert Beausoliel, Jr.
*Assistant Examiner* — Arthur Ganger
(74) *Attorney, Agent, or Firm* — Davis Wright Tremaine LLP

(57) ABSTRACT

A computing resource service provider may store user data in a distributed data storage system. The distributed data storage system may contain one or more storage nodes configured to store hierarchical data in one or more data stores such as a column data store. Data in the data stores may be compressed or otherwise encoded, by a storage optimizer, in order to reduce that redundancy in the hierarchical data stored in the one or more data stores. Responses to user queries may be fulfilled based at least in part on data stored in the one or more data stores. A query processor may scan multiple different data stores across various storage nodes in order to obtain items responsive to the user query.

20 Claims, 8 Drawing Sheets

DISTRIBUTED DATA STORE FOR HIERARCHICAL DATA

BACKGROUND

Modern computing systems place a high importance on secure and reliable data storage. Modern computer systems also increasingly use simple, lightweight computing instances dedicated to solving specific problems. In many computer systems, particularly distributed computer systems and those utilizing system virtualization computing environments where a plurality of guest virtual machines may be hosted on shared physical host machines, secure and reliable data storage may become a concern. Secure and reliable data storage systems such as, for example, redundant storage systems may help to alleviate this concern, but such storage systems can be cumbersome and expensive, particularly in highly complex distributed or virtualized systems comprising large numbers of host machines, a correspondingly large number of guest virtual machines and a commensurate number of redundant storage nodes. Additionally, as the number of client systems increases, the overhead associated with attaching typical redundant storage resources to client systems may quickly exhaust the resource of the host computing system environment, resulting in reduced performance, resource scarcity and an increasingly degraded user experience.

BRIEF DESCRIPTION OF THE DRAWINGS

Various embodiments in accordance with the present disclosure will be described with reference to the drawings, in which.

DETAILED DESCRIPTION

Figure 1:
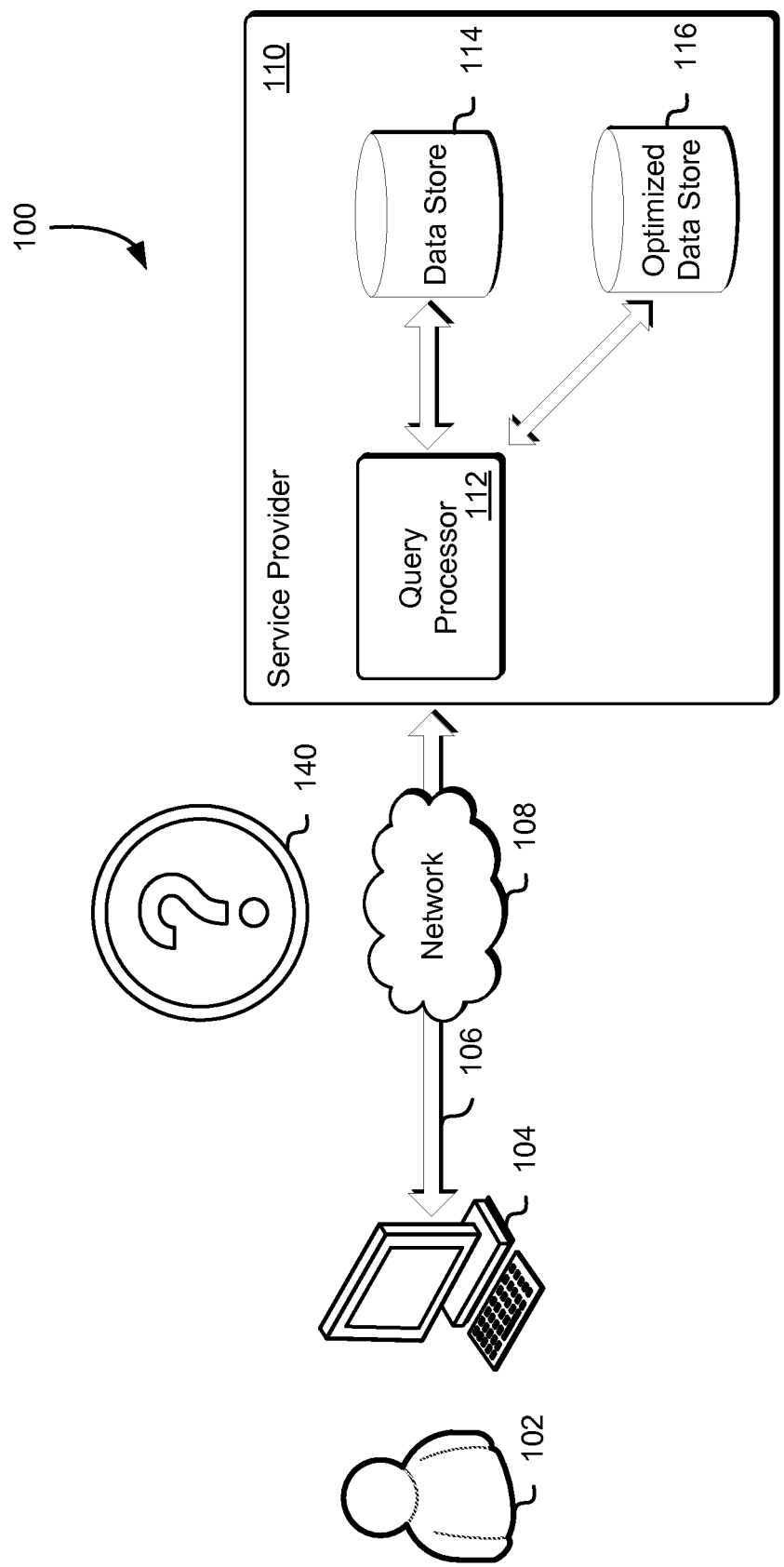
FIG. 1 shows an illustrative example of processing a query on a distributed data store in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to storing data in a column-oriented fashion for rapid query processing using a large number of low-powered data storage nodes (also referred to as storage nodes or simply nodes). Records may be stored in highly-partitioned column tables that compactly represent data using prefix compression. Storing data in such a manner may be referred to as sharding data or a database shard. Individual column tables may be replicated within a ring address space. The ring may be an organization of data wherein the data is sorted according to a determined order and each data item has two distinct neighbors, referred to herein as an "upstream" neighbor and a "downstream" neighbor. The upstream neighbor is the data item that is immediately before the data item according to the sorting order and the downstream neighbor is the data item that is immediately after the data item according to the sorting order. In various examples, neighbors are singly connected, and the ring is completed or closed by connecting the last data item in the sorted data to the first data item.

Distributed data storage locations (also referred to herein as distributed data stores or simply data stores) may be used to store information across multiple nodes in a computer network. A single data item may be stored, for example, in a single storage location or may be stored redundantly in multiple storage locations, such as in the ring described above. The use of distributed data stores, in various embodiments, improves the availability of the data, improves the reliability of the data, reduces the latency of data access and/or otherwise improves other operational characteristics of the storing data. For example, the reliability of a data item may be increased by storing redundant copies and/or by using redundant copies to verify that a data item has not been altered. The availability of data may be increased and/or the latency of access may be reduced by placing a copy of a data item physically or logically (according to network communications) close to the user, client, process, service and/or other such computer system entity that may require access to the data item. The one or more data items may be generated by a user or by an automated process, such as access logs, task logs, debug data, error codes or any other data generate with user interaction.

In an embodiment, the distributed storage nodes may include an append data store and an optimized data store (also referred to as a packed data store). As data is received by the nodes, it may be processed by a storage optimizer in order to create packed data to be stored in the optimized data store. The data may be compressed using a variety of techniques that compress data by at least identifying and eliminating statistical redundancy in the data in order to create packed data. However, packing data in this manner to be stored in the optimized data store may take more effort than simply storing the data. Situations may arise where requests to store data are received by the storage nodes faster than the storage optimizer can compress the data into packed data and store the packed data in the optimized data store. On these situations, overflow data may be stored in the append data store. The append data store may be configured such that data is added to the append data store without processing or otherwise reducing the redundancy in the data. Overflow data may be any data received above the storage optimizer's capacity. Data in the append data store may be periodically or aperiodically removed, compressed and then stored in the optimized data store by the storage optimizer.

Furthermore, users may submit queries for data stored in the distributed data stores using a query interface or similar service. User queries may be broken into partitioned sub-queries on corresponding column tables with sub-query rescheduling on one or more other storage nodes that share at least some common data in order to reduce latency. User queries may employ several search criteria to further reduce latency. For example, the user may select a certain percentage of the total number of possible records to be returned in order to satisfy the query. The user may also select multiple storage nodes from which to retrieve data or the service provider may transmit the query to multiple query processors for fulfillment. Furthermore, one or more systems or services of the service provider, such as the front end, may receive a user query and determine, based at least in part on the user query, one or more storage nodes and/or query processor to satisfy the user query. For example, the front end may receive a user query and determine, based at least in part on the user query, the location of one or more records responsive to the user query and transmit the user query to a particular query processor capable of retrieving the one or more records.

When a user submits a query, a front end processing system (also referred to simply as a front end) may receive the user query. The user query may contain query constraints and a completeness parameter. For example, the user query may contain a search string and a percentage of the total of possible results that will satisfy the query. The front end may then forward the user query to one or more storage nodes containing data relevant to the query, based at least in part on the query constraints. The query may be received at a first storage node, the first storage node may scan a plurality of column tables, and at least a subset of the tables in the plurality of column tables may contain a prefix compressed collection of column values. The prefix compressed data may be a hierarchically structured schema for the column values.

The storage node may perform the prefix compression operations by appending values to the column table based on an insert order and scheduling a repacking task to split, join, or reorder column tables when system load is lower. The storage node may reorder column values, for example, to reduce suffix lengths or to eliminate look behind overrides. The storage node may store ordinals as fixed length bit fields wherein the chosen length is based at least in part on identifying a range of compression parameters for the existing column values.

The first storage node may include a query processor responsible for executing the query request on the first storage node. The query processor may allow the query to execute on the storage node for a particular amount of time. Once a run time for the user query exceeds a threshold value, the front end may examine results returned by the one or more storage nodes, including the first storage node. The query processor may also track the run time for the user query and if the run time exceeds a threshold value the query processor may select one or more other storage node to transmit duplicate user queries for processing of the user query. Furthermore, users may specify a work factor that reduces the threshold value and causes duplicate queries to be transmitted sooner than if no work factor had been specified by the user. For example, the user may pay a fee to have duplicate queries processed sooner (e.g., selecting a certain number of queries to be processed in parallel) and reduce latency on the query request. The front end may then determine that the user query is insufficiently satisfied based on the completeness parameter and the returned results. The front end may select a second storage node, not included in the one or more storage nodes, where the second storage node includes at least one column table in common with the one or more storage nodes and at least one column table is not included in the returned results. The front end may forward the user query to the second storage node to be executed by the query processor on the second node. Furthermore, the storage node may search both the append data store and the optimized data store in order to obtain results to fulfill the query. The storage nodes or front end may also maintain an estimate, or estimate at the time the query is received, the total number of possible results for a particular query.

FIG. 1 illustrates an example environment 100 where one or more computer systems running within a computing resource service provider environment, as well as the associated code running thereon, may operate a distributed column store for hierarchical data. A user 102 may connect 106 to a query processor 112 through a computer system client device 104 and may initiate connection with and/or interaction with one or more storage node associated with the query processor 112. For example, the user may submit a query request 140 for data stored in a data store 114 or an optimized data store 116 operated by the service provider 110. The user may submit the query through a query interface described in detail below in connection with FIG. 3. The query processor 112, the data store 114 and the optimized data store 116 may be operating within a service provider 210. In some embodiments, the computing resource service provider 110 may provide a distributed, virtualized and/or datacenter environment within which one or more applications, processes, services, virtual machines and/or other such computer system entities may be executed. The data store 114 and the optimized data store 116 may be used to store a variety of different data, including hierarchical data such as domain names, data indexes, deoxyribonucleic acid (DNA) sequences, organizational data, structured data, key values, relational data or any other hierarchical data.

The user 102 may submit queries over a connection 104, the connection 104 may be established over a network 108. The network 108 may be any suitable network such as the Internet, a local area network, wide area network or any other suitable communications network and/or other networks noted herein and/or combinations of networks. The query request 140 may be received by the query processor 112 directly or may be forwarded to the query processor by one or more services or servers of the service provider. For example, the query request 140 may be received by a front end operated by the service provider and forwarded to one or more query processors 112. The front end may determine one or more query processors capable of fulfilling the query request 140 and forward the query request 140, based at least in part on the determination.

Once a query request 140 has been received at the query processor 112, the query processor may generate a filter based at least in part on the query request. The filter may be configured to determine whether a particular record stored in the data store 114 or the optimized data store 116 satisfies the query. Using the filter, the query processor or other system may scan the data store 114 and/or the optimized data store 116 in order to obtain query results. The data store 114 and the optimized data store 116 may store data in a column store or other data storage structure. The query request 140 may contain a threshold value indicating an amount of data to be returned in order to satisfy the request. For example, the request query 140 may indicate that one thousand records should be returned in order to fulfill the request. In another example, the query 140 may indicate a percentage of the total number of records to examine in order to fulfill the request. Furthermore, the query processor 112 may estimate a total number of records that meet the query requirements in order to determine if the threshold percentage has been reached when returning results in response to the query request 140.

The query processor 112 may satisfy the query request 140 using data stored in the data store 114 and/or the optimized data store 116. If the query processor 112 determines that the data store 114 and the optimized data store 116 do not have sufficient data to satisfy the query request 140, the query processor 112 may scan one or more other storage devices, such as a remote data store. The query processor 112 may also transmit one or more duplicate query requests to remote query processors or remote storage nodes. The query processor 112 may return results to the front end and the front end may determine whether to transmit duplicate query requests.

Figure 2:
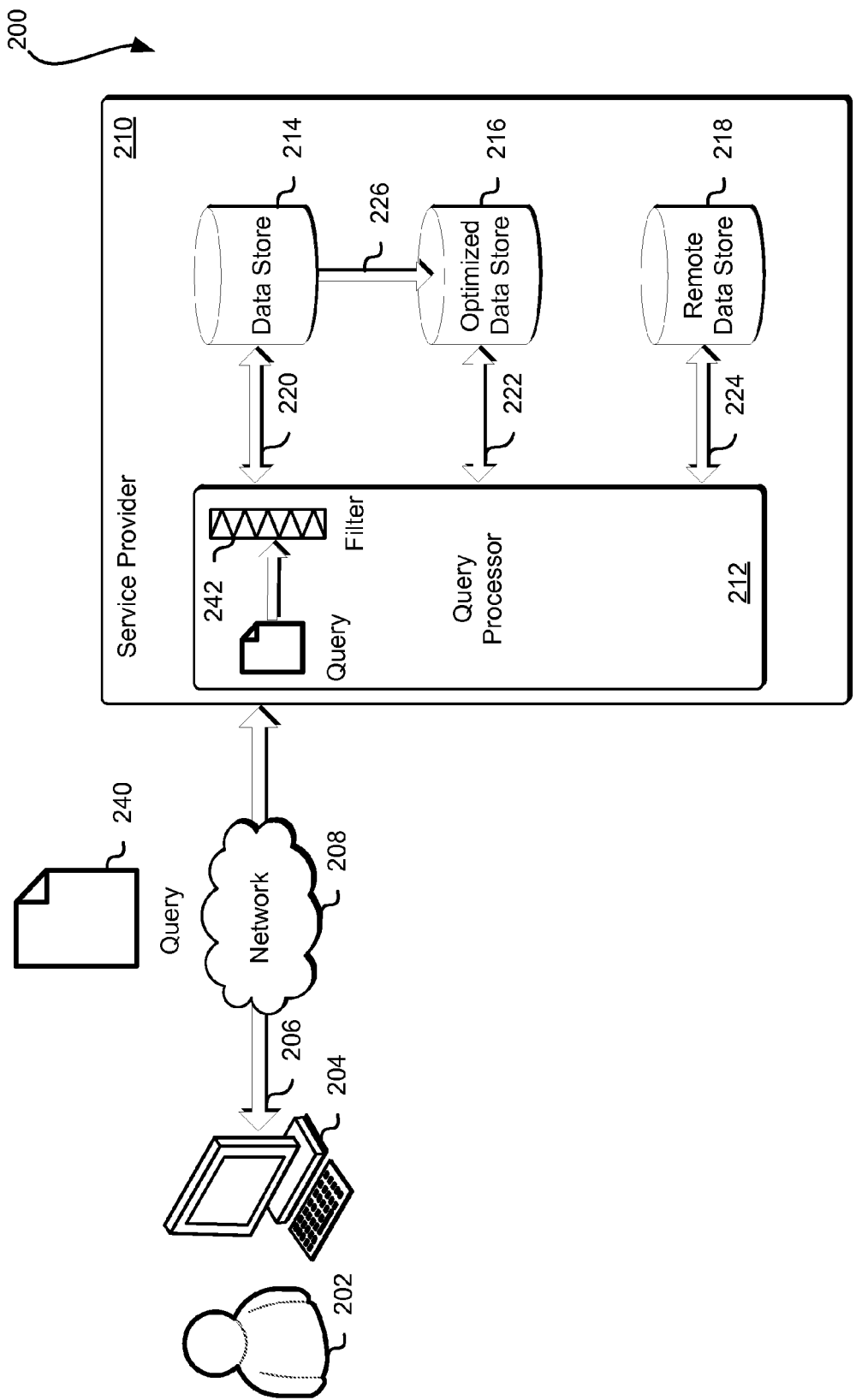
FIG. 2 shows an illustrative example of processing, by a query processor, a query on a distributed data store in accordance with various embodiments.

FIG. 2 illustrates an example environment 200 where one or more computer systems running within a computing resource service provider environment, as well as the associated code running thereon, may have redundant storage resources attached in accordance with at least one embodiment. A user 202 may connect 206 to a query processor 212 through a computer system client device 204 and may initiate connection with and/or interaction with one or more applications running on the query processor 212. The query processor 212 may be operating within a service provider 210. In some embodiments, the service provider 210 may provide a distributed, virtualized and/or datacenter environment within which one or more applications, processes, services, virtual machines and/or other such computer system entities may be executed. In some embodiments, the user 202 may be a person, or may be a process running on one or more remote computer systems, or may be some other computer system entity, user or process. The command or commands to connect to the computer system instance may originate from an outside computer system and/or server, or may originate from an entity, user or process on a remote network location, or may originate from an entity, user or process within the computing resource service provider, or may originate from a user of the computer system client device 204, or may originate as a result of an automatic process or may originate as a result of a combination of these and/or other such origin entities. In some embodiments, the command or commands to initiate the connection 206 to the service provider 210 may be sent to the query process 212, without the intervention of a user 202. The command or commands to initiate the connection 206 to the query processor 212 may originate from the same origin as the command or commands to connect to the service provider 210 or may originate from another computer system and/or server, or may originate from a different entity, user or process on the same or a different remote network location, or may originate from a different entity, user or process within the computing resource service provider, or may originate from a different user of a computer system client device 204, or may originate as a result of a combination of these and/or other such same and/or different entities. For example, the connection to the query processor may be established by the user 202 first connection to a front end system and the front end system may then establish a connection to the query processor 212.

The user 202 may request connection to the service provider 210 via one or more connections 206 and, in some embodiments, via one or more networks 208 and/or entities associated therewith, such as servers connected to the network, either directly or indirectly. The computer system client device 204 that may request access to the query process 212 may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

The service provider 210 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The service provider 210 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines may be physical machines located within the computer system environment. In some embodiments, the host machines may be guest virtual machines operating on physical machines located within the computer system environment.

The query processor 212 may be connected to one or more replicated storage locations. In the example illustrated in FIG. 2, the query processor 212 is connected to a data store 214, connected to optimized data store 216 and connected to a remote data 218. The computer system may write to a data item or record stored in data store 214 via connection 220. A write to a data item stored in data store 214 may be optimized by a storage optimizer and store via connection 226 to the optimized data store 216. The remote data store 218 may contain replicated or partially replicated data from either data store 214 or optimized data store 216 or the remote data store 218. In some embodiments, the storage optimizer may periodically compress data contained in data store 214 and transfer the compressed data to the optimized data store.

The user 202 may generate one or more queries 240 using the computer system client device 204 and transmit queries 240 to the service provider 210 over connection 206. The queries 240 may include a data set, record indexes, alphanumeric text, search string, images, audio, location, query terms or any other information suitable for identifying one or more data items stored by the service provider. The query may be received by the query processor 212 or one or more other services of the service provider 210. For example, the query 240 may be generated by a web server, operated by the service provider, based at least in part on information provided by an application executed by the computer system client device 204. The web server may transmit the request to the query processor 212 for fulfillment and the query processor may return the results to the web server or directly to the computer system client device 204. A filter 242 may be generated based at least in part on the query 240. The filter 242 may be generated by the query processor 212 or one or more other services of the online retailer. The filter may be any filter capable of determining whether a particular data item or record is within the set of data items or records that satisfy the query 240. For example, the filter may be a bloom filter configured to test whether a particular element is a member of a set.

The query processor 212 may then scan the optimized data store 216 using filter 242 in order to obtain data items to satisfy the query 240. If the query processor 212 obtains sufficient data items from the optimized data store 216, the query processor may terminate execution of the query 240 and return the results. In various embodiments, regardless of whether the query processor 212 obtains sufficient data items from the optimized data store 216, the query processor 212 continues to execute the query 204 by at least scanning the data store 214 and the remote data store 218. If, however, the query processor 212 does not obtain sufficient data items from the optimized data store 216, the query processor 212 may then attempt to retrieve additional data items from one or more other data stores in order to satisfy the query 240. For example, if the query processor 212 does not obtain sufficient data items from the optimized data store 216, the query processor 212 may then scan using filter 242 the data store 214. Data store 214 may be an append data store or similar data store. If the query processor still has not obtained sufficient data items to satisfy the query 240, the query processor 212 may cause the remote data store 218 to be scanned.

Figure 3:
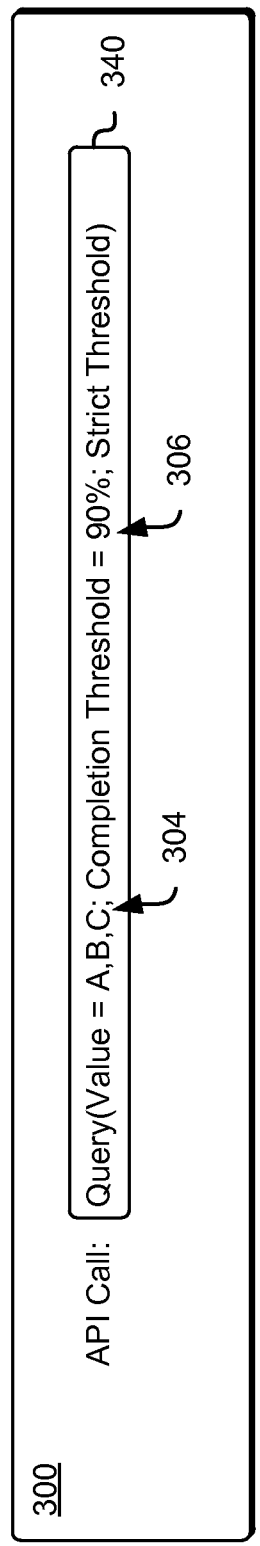
FIG. 3 shows an illustrative example of an application programming interface call in accordance with various embodiments.

FIG. 3 illustrates an example application programming interface (API) call 300 where a user enters a search query 340 and defines various options further defining the execution of the query 340. The API call 300 may be provided as part of a web page, a single-page application, a stand-alone application, a mobile application or as part of any other interface suitable for receiving user selection. The API call 300 generated, based at least in part on user input, the user input may be received using an appropriate input device such as a mouse, keyboard, controller, touch screen, keypad or any other device suitable for capturing user commands. The query may contain a string of characters capable of identifying one or more data items stored by the service provider. The API call may be generated by an automatic process based at least in part on user input.

Along with entering the query 340, the API call may be configured with one or more options further defining the operation of the query processor or other service executing the query. The options may include, as illustrated in FIG. 3, a completion threshold 304 and strict 306 or loose adherence to the threshold. Completion threshold 304 indicates a percentage of the total number of possible results which, when returned in response to the query, may be considered as satisfying the query. Furthermore, the query processor may determine or the API call may specify a number for records to be excluded from the total number of possible records when determining the threshold. For example, the query 340 may include a search string configured to return data logs generated by one or more computer system instance, the data logs may be stored by the service provider on a plurality of different storage node and may also include replicated copies on a plurality of other storage nodes. The user may further specify a percentage of the total number of data logs to be searched in order for the query 340 to be considered complete, the specified percentage may be referred to as a completion threshold 304. As an example, the user may select a particular completion threshold 304 percentage from a drop down list presented in a user interface, although any suitable mechanism for capturing user selection may be used in accordance with the present disclosure.

The user may further modify the execution of the query 340 by selecting the strict 306 threshold or the loose threshold. The strict 306 threshold may modify execution of the query 340 such that as soon as the completion percentage is reached the query 340 is terminated and no further searching or scanning is done. The loose threshold may allow the query processor or other service executing the query 340 to continue searching one or more data stores for data items that satisfy the query. For example, the user may select a completion percentage of 40 percent and the loose threshold, the query 340 may then be received by the query processor and the query processor may obtain 40 percent of the total number of possible records from the optimized data store. The query processor may continue and search other data stores, such as the append data store or the remote data store, for data items that satisfy the query 340. The APL call 300 may also allow for a variety of other options that may modify the operation of the query including a time out period, a set period of time the query is to execute, return query results as they are obtained or only upon termination of the query, error handling and any other option suitable for modifying the execution of the query 340. Query results may also be paginated. Furthermore, the execution of the query may be paused by the user or when a certain number of results have been return. The execution of the query may be resumed with or without contemporaneous user input.

Figure 4:
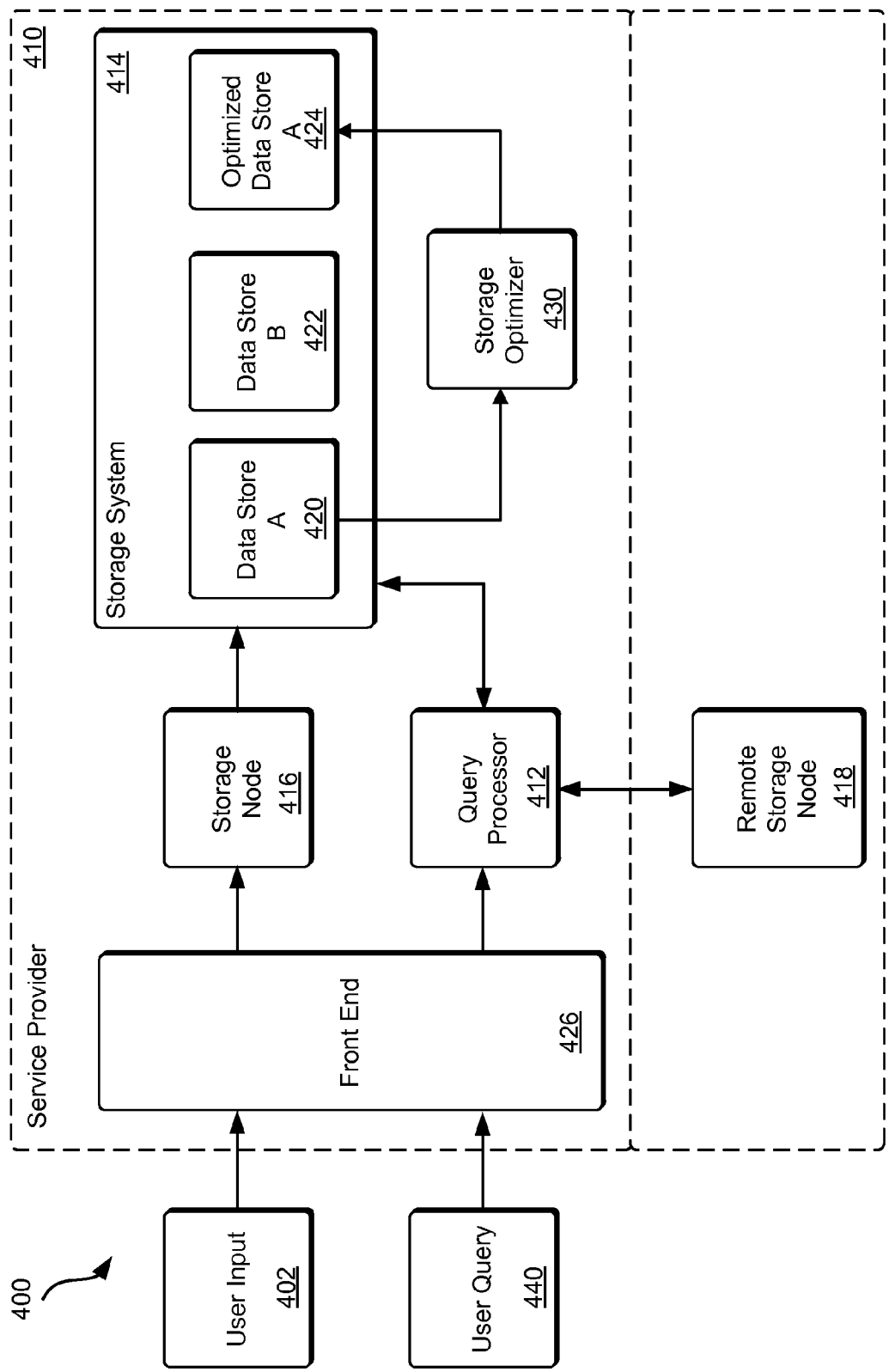
FIG. 4 shows an illustrative example of a distributed data storage environment, for storing data remotely and processing queries, in which various embodiments can be practiced.

FIG. 4 is an illustrative example of an environment 400 illustrating various aspects of the present disclosure. As noted above, techniques described herein are applicable to distributed column stores for hierarchical data and responding to queries for data contained in the distributed data stores. Accordingly, FIG. 4 shows a service provider 410, the service provider 410 one or more computing systems. For example, the computing systems may be part of a data center operated by the service provider in order to provide computing resources and services to one or more users. The computing systems may include a front end 426, a storage node 416, a query processor 412, a storage optimizer 430 and a storage system 414. The service provider 410 may also operate remote computer systems such as a remote storage node 418. The service provider 410 or one or more systems of the service provider may receive a user input 402 and a user query 440.

The user input 402 may include any data caused by the user to be stored by the service provider. For example, the user input 402 may include data logs generated by computer systems operated by the user. In another example, the user input 402 may be data generated by one or more virtual computer system instances executed by the service provider 410 on behalf of the user. Data designated as user input 402 may be received by the front end 426. The front end 426 may be a collection of computing resources collectively configured to receive user input 402 and user query 440 and direct the data to the appropriate computer system or service of the service provider 410 such that the received data may be processed accordingly. The front end 424 may be a physical or virtual computing device including a processor and memory and programmed to perform to receive user queries 440 and direct the queries to the appropriate query processor 412. In the case of the user input 402, the front end 426 may use one or more distribution algorithms to place the user input 402 in the appropriate distributed storage node. The front end 426 may also direct the user query 440 to the appropriate query processor 412 or may direct the user query 440 to a plurality of query processors. The front end 426 may direct the user query 440 based at least in part on a variety of factors such as the availability of the query processors 412, the availability of the storage nodes 416, the data contained in the storage nodes 416 associated with the query processors 412, latency of the query processors 412 and/or storage nodes 416, physical location of the query processors 412 and/or storage nodes 416, network location of the query processors 412 and/or storage nodes 416 or any other suitable factor for distributing queries in a distributed storage environment.

The query processor 412 may be a collection of computing resources collectively configured to obtain data from one or more data stores in response to the user query 440. The query processor 412 may be a physical or virtual computer system including memory and a processor programmed to search one or more data stores for data items responsive to the user query 440. The query processor, as described above in FIG. 2, may generate a filter based at least in part on the user query 440. The query processor 412 may then use the filter to obtain from a storage system 414 of storage node 416 data item useable to fulfill the user query 440. Storage node 416 may be a collection of computing resources collectively configured to provide storage for users of the service provider 410. The storage node 416 may be a physical or virtual storage device, such as a database, and may further include a processor and a memory with instruction that when executed by the processor cause to the storage node 416 to store data. The storage node 416 may receive data to be stored on behalf of the user or one or more other systems of the service provider 410. The storage node 416 may cause the received data to be stored in the storage system 414. The query processor 412 may be further configured to estimate the total number of possible results returned for a user query 440. Based at least in part the estimate, the query processor 412 may duplicate the user query to one or more remote storage nodes 418 or scan additional data stores of storage node 416. The remote data store 418 may be a collection of computing resources collectively configured to store data in a distributed data storage system. The remote data store 418 may also be configured to transmit user query 440 to query processor 412. The remote data store 418 may be a physical or virtual storage device, such as a database, and may further include a processor and a memory with instruction that when executed by the processor cause the remote data store 418 to store data.

As illustrated in FIG. 4, the storage system 414 may contain multiple data stores, including a data store A 420, a data store B 422 and an optimized data store A 424. The storage system 414 may be a collection of computing resources collectively configured to store data, such as a hard disk, random access memory, read only memory, network attached storage or any other device suitable for storing data. The data store A 420, the data store B 422 and the optimized data store A 424 may be a collection of computing resources collectively configure to store data in a structured manner or unstructured manner. The data store A 420, the data store B 422 and the optimized data store A 424 may be database applications executing on the storage system 414 and programmed to store data in a particular format. For example, the data store A 420 and the data store B 422 may be append data stores which are configured to store data by appending the data to the data store. In another example, the optimized data store may be configured to store packed or otherwise compressed data. Although only three data stores are illustrated as part of storage system 414 in FIG. 4, any number of storage nodes may be contained in storage system 414. Furthermore, the storage nodes may contain data at various levels of compression. For example, the data store A 420 may contain only raw data, the data store B 422 may contain partially compressed data and the optimized data store A 424 may contain fully compressed data.

The storage optimizer 430 may be a collection of computing resources collectively configured to extract data from one or more data stores of storage system 414 and compress the extracted data in order to generate optimized data store A 424. The storage optimizer 430 may be a physical or virtual computer system including memory and a processor programmed to determine statistical redundancies in data and remove at least a portion of the redundant data in order to compress that data. The storage optimizer 430 may use a variety of techniques alone or in combination to generate optimized data store A 424. The storage optimizer 430 may remove preprocessed data or preprocessed data items from data store A 420 and may generate processed data or processed data items based at least in part on the preprocessed data or preprocessed data items. Data store A 420 may be an append data store or other data store configured to store data with minimal processing. Preprocessed data items may include any records stored in a storage node of the service provider 410 that have not be encoded or otherwise processed to remove redundancy in the data items. The preprocessed data items may also include records that have been partially encoded or otherwise processed to remove redundancy in the data items. The preprocessed data stored in the appended data store may be considered preprocessed in relation to the corresponding processed data in the optimized data store A 424. Once the storage optimizer 430 or other service of the service provider 410 has encoded the data items stored in data store A 420, removed the corresponding data items from data store A 420 and stored the encoded data items in the optimized data store A 424, the data items may be considered processed data items. Various techniques may be used to process preprocessed data items in order to generate processed data items, the various techniques are described in greater detail below in connection with FIG. 5.

Furthermore, the storage optimizer may also optimize or partially optimize the data in the data store A 420 and the data store B 422. For example, the storage node 416 may receive overflow data from user input 402. As a result, the storage node 416 may cause storage system 414 to store the overflow data in data store A 420. The storage optimizer may not have the current computing capacity to fully compress the overflow data as it is being written to data store A 420, but may have the computing capacity to partially optimize the overflow data. For example, the storage optimizer 430 may implement a reuse count in order to encode the overflow data as it is being written to data store A 420. The storage optimizer 430 may remove preprocessed data items from the data store A 420 and process the data items in order to generate processed data items. The storage optimizer 430 may then cause the processed data items to be stored in the optimized data store A 424, the processed data items may correspond to the preprocessed data items removed from the data store a 420.

Figure 5:
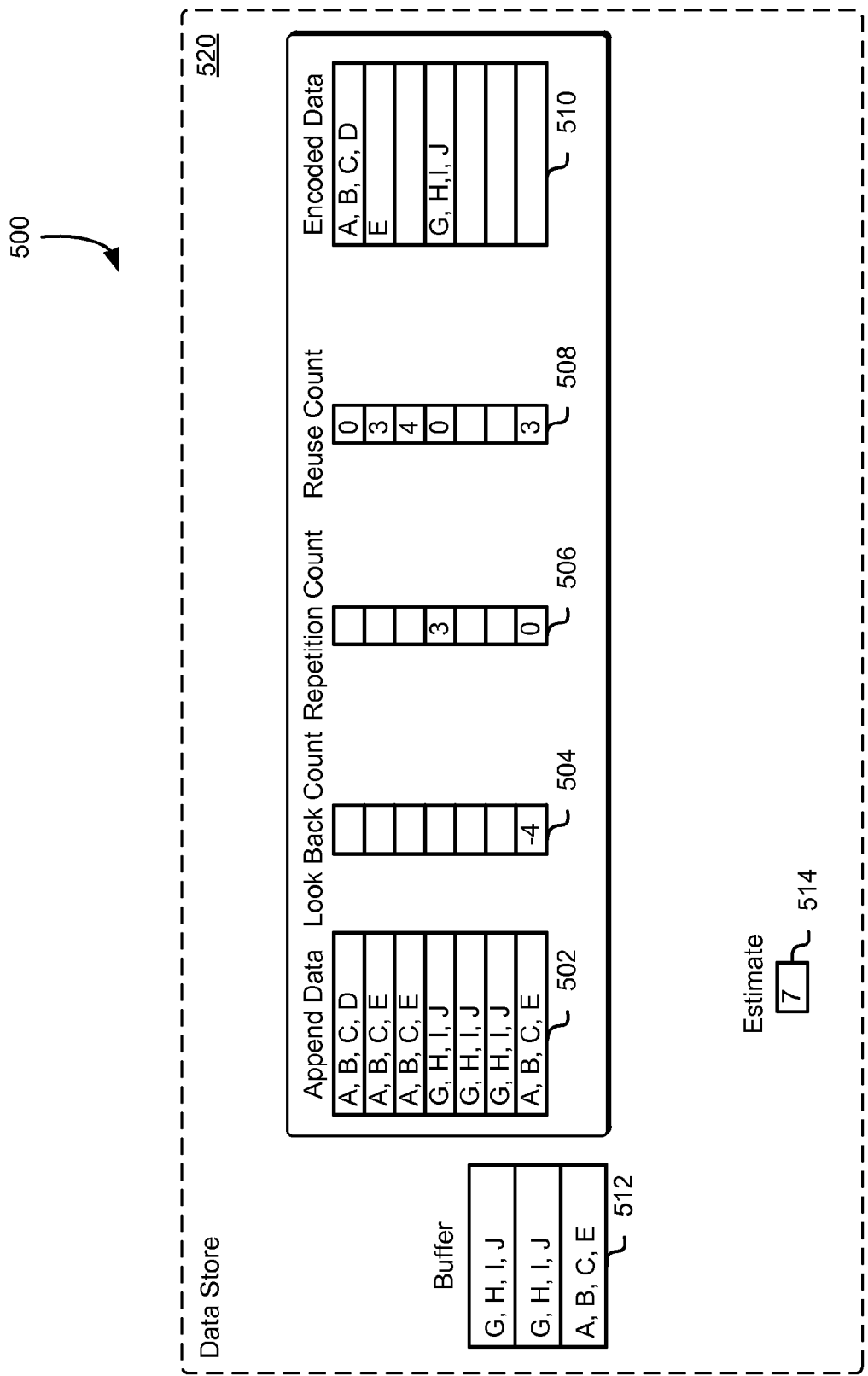
FIG. 5 shows an illustrative example of a column data store with at least partially encoded data in accordance with various embodiments.

FIG. 5 is an illustrative example of an environment 500 illustrating various aspects of the present disclosure. As noted above, techniques described herein are applicable to distributed column stores for hierarchical data and responding to queries for data contained in the distributed data stores. Accordingly, FIG. 5 shows a data store 520, the data store is configured to store data as a column store. The data store 520 may include a buffer 512, the buffer 512 may enable the data optimizer to perform various data optimization techniques, such as a negative look behind. The data store 520 may also contain an estimate 514. The estimate 514 may be an estimate of the number of uncompressed records contained in the data store 520. For example, the estimate 514 may indicate the amount of overflow data contained in data store 520. The estimate 514 may be used by the query processor to determine whether to scan the data store 520 in order to obtain query results. In various embodiments, the estimate 514 may be an estimate of the total number of results satisfying a particular query included in the data store 520. The data store 520 may store data in an append-only format, the append-only format may cause data store 520 to only add data without performing certain optimization operations such as reordering data in the data store. Append data 520 may contain the data in a raw format such that no data compression and/or packing has been performed on the append data 502.

In one embodiment, the hierarchically structured schema for the column values may be represented as a sequence of sub-records for a value referred to as a reuse count 508. For example, a first value being "A, B, C, D." The prefix compression operation may compress a subsequent second value of "A, B, C, E" by storing the second value as "3, E" where the ordinal 3 specifies the number of hierarchy levels in common between the first and second values and the data "E" specifies a suffix for the second value. The ordinal may be stored in the reuse count 508 indicating the number of hierarchy levels to reuse from the previous record. In another embodiment, a repetition count 506 may be used to compress the data. For example, the prefix compression operation may compress one or more subsequent values, all identically "A, B, F," by storing the values as "2, 3, F" where the first ordinal 3 specifies the number of common hierarchy levels with the previous value, the second ordinal 2 specifies the number of repetitions of the value, and the data specifies a suffix for the value.

In another embodiment, a lock back count 504 may be used in order to implement negative look behind encoding. For example, the prefix compression operation may compress subsequent values, all identically "A, B, C, D, G," by storing the values as "4, 2, −5, G" where the first ordinal 4 specifies the number of common hierarchy levels with the first value, the second ordinal 2 specifies the number of repetitions of the value, the third ordinal −5 overrides the compression look behind to be the first value instead of the predecessor value, and the data specifies a suffix for the value.

Figure 6:
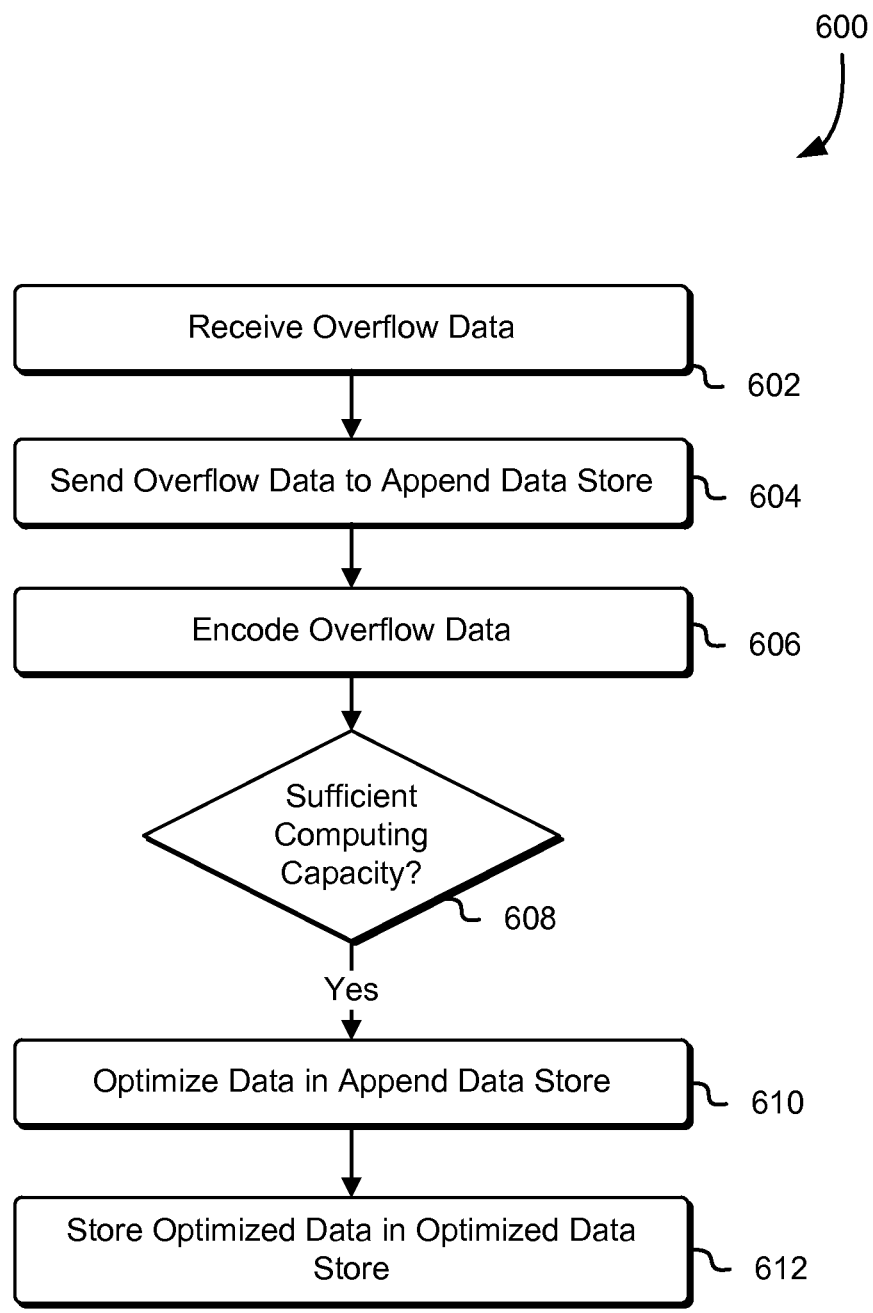
FIG. 6 shows an illustrative example of a process for implementing a data storage node in accordance with at least one embodiment.

FIG. 6 shows an illustrative example of a process 600 which may be used to store data in a distributed storage system. The process 600 may be performed by any suitable system, such as by the storage node 416 as described in connection with FIG. 4. Returning to FIG. 6, in an embodiment, the process 600 includes receiving overflow data 602. Overflow data may include data received by the storage node that the storage optimizer is incapable of processing due to constraints on current computing capacity of the storage optimizer. In various embodiments, all data received at the storage node is considered overflow data regardless of current computing capacity. The overflow data may be sent to the append data store 604 for storage. The append data store may be implements as append data 502 as described above in FIG. 5. The overflow data may be stored in a data store associated with the storage node.

The overflow data stored in the append data store may be encoded 606 or partially encoded. The data may be encoded using any of the techniques described herein, such as those described above in connection with FIG. 5, or any other encoding technique suitable for reducing the redundancy in data. The overflow data may be encoded by the storage optimizer or other component of the storage node. In numerous variations to process 600, the overflow data in not encoded as it is being written to the append data store, instead the overflow data is periodically compressed by the storage optimizer to generate optimized data. The period for compressing the overflow data may be determined at least in part by the computing capacity of the storage optimizer.

Returning to process 600, the storage node or component thereof, such as the storage optimizer, may determine if there is sufficient computing capacity 608 to perform one or more optimization operations on the overflow data contained in the append data store. If there is insufficient computing capacity, the process 600 may wait until there is sufficient computing capacity to continue. If there is sufficient computing capacity, the storage optimizer may optimize data contained in the append data store 610. For example, the storage optimizer may reorder the records contained in the append data to eliminate the look back count 504 as described above in connection with FIG. 5. The storage optimizer may remove the data from the append data store and perform one or more optimization operations. Optimization operations may include any operation to reduce the redundancy in the records contained in the append data store. Once the storage optimizer has optimized the data, the optimized data may be stored in the optimized data store 612. The optimized data store may contain overflow data that has been compressed in order to reduce the size of the data and enable efficient searching and scanning of the data in order to obtain results for user queries.

Figure 7:
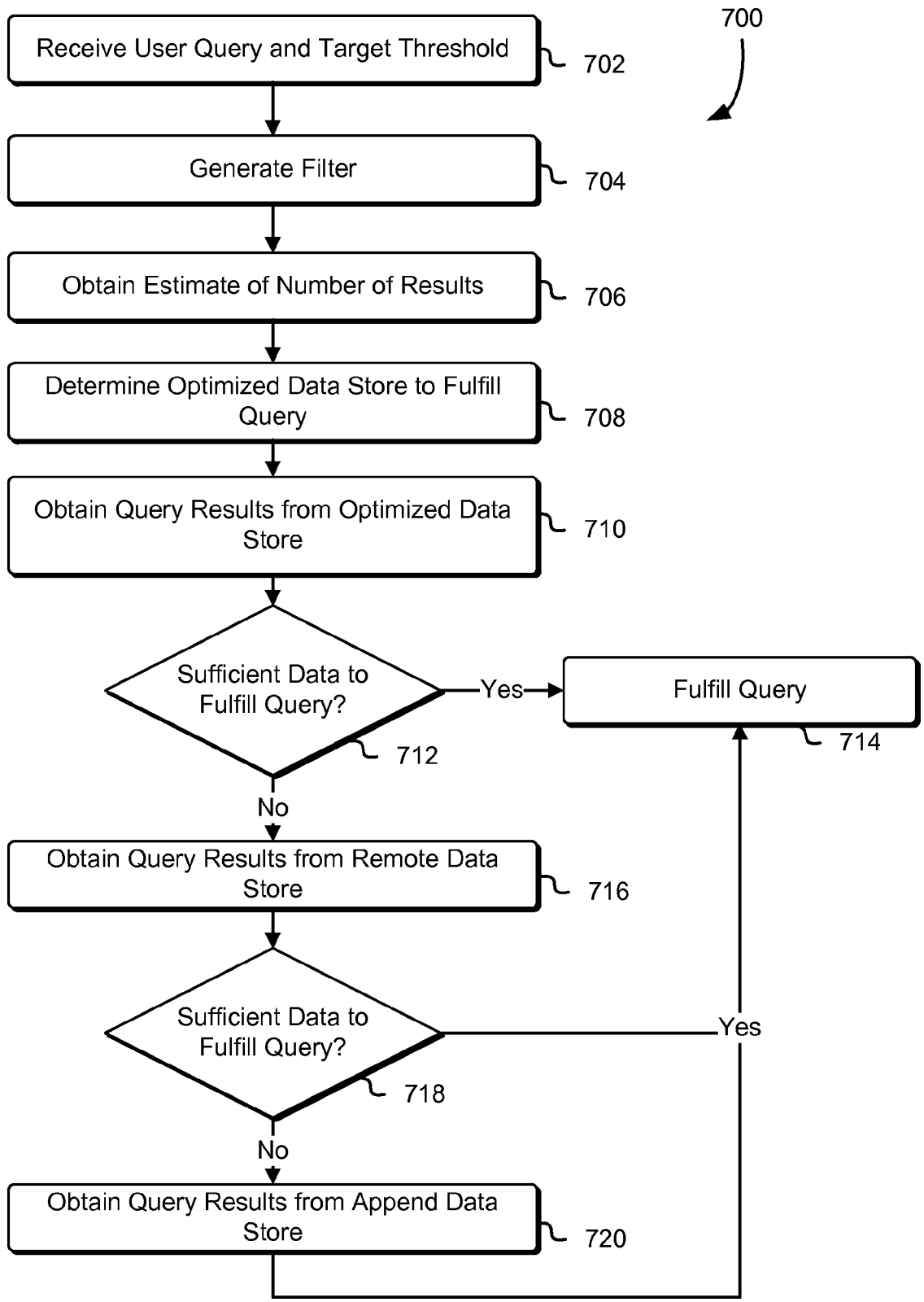
FIG. 7 shows an illustrative example of a process for satisfying a query request in accordance with at least one embodiment.

FIG. 7 shows an illustrative example of a process 700 which may be used to return results in response to a user query. The process 700 may be performed by any suitable system, such as by the query processor 412 as described in connection with FIG. 4. Returning to FIG. 7, in an embodiment, the process 700 includes receiving a user query and target threshold 602. The user query and target threshold may be received directly from a user operating a computing device or from a front end as described above in connection with FIG. 4. The user may specify a particular query processor or the user may allow the service provider to select a particular query processor. The user may also specify a target threshold, such as the completion threshold 304 described above in connection with FIG. 3. In numerous variations of process 700, the user may include other options to alter the execution of the search query. Furthermore, the service provider may provide a default option for information not supplied or other specified by the user.

Once the query processor has received the query, the query processor or other computer system may generate a filter 704. The filter may be configured to obtain records that are a member of the set of records that satisfy the query. The query processor may also obtain an estimate of the number of results 706. The query processor may obtain an estimate based at least in part on the data contained in one or more data stores associated with the query processor. The query processor may also maintain an estimate of like data entries. The query processor may then determine an optimized data store to fulfill the query 708. The query processor may determine the optimized data store based at least in part on the data contained in the optimized data store. In numerous variations of process 700, the query processor may be associated with only one optimized data store.

The query processor may obtain one or more query results from the optimized data store 710. The query processor may scan the optimized data store using the generated filter and copy any records indicated by the filter that satisfy the query. If there is sufficient data to satisfy query 712 (e.g., the target threshold has been met or exceeded), the query may be fulfilled 714.

Fulfilling the query 714 may include transmitting the data directly to the user, to an application indicated by the user, to one or more computer systems of the service provider or otherwise making available to the user the results of the query. However, if the target threshold is not met, the query processor may obtain query results from a remote data store 716. The query processor may transmit a duplicate request, over a network, to one or more remote storage nodes. One or more remote query processors associated with the one or more remote storage nodes may receive the query and execute the query. The one or more remote query processors may perform process 700 in order to fulfill the duplicate query. The one or more remote query processors may return query results to the query processor, the user directly or one or more other computer systems of the service provider. An indication may be provided to the query processor, indicating whether the one or more remote query processors completed the request and/or the number of results returned. The query processor may use the number of results returned by the one or more remote query processors in order to calculate whether the target threshold has been achieved.

If sufficient query results were returned by the one or more remote query processors 718, the query processor may fulfill the query 714. However, if insufficient data was returned 718, the query processor may obtain query results from the append data store 720. The append data store may be partially encoded and may also contain an estimate of the amount of data contained in the append data store that is not encoded. Once the results have been obtained from the append data store 720, the particular storage node associated with the query processor may fulfill the query 714. The storage node may be exhausted of records satisfying the query regardless of the target threshold being met.

Although process 700 shows fulfilling the query as a sequential process, the query processor may partition the query and distribute the partitions to be executed in parallel or the query processor may distribute the entire query to be executed in parallel amount multiple query processors. Furthermore, process 700 may be modified such that the data stores may be scanned in any order. For example, the query processor may first obtain query results from the optimized data store, then the append data store and finally the remote data store. Process 700 may also include obtaining query results from any number of data stores, either locally or remotely. The query processor may also terminate execution of process 700 immediately upon achieving the target threshold regardless of the current state of the system performing process 700. If the process 700 is terminated after one or more duplicate queries have been transmitted by the query processor, the query processor may transmit an indication to terminate the one or more duplicate queries.

Figure 8:
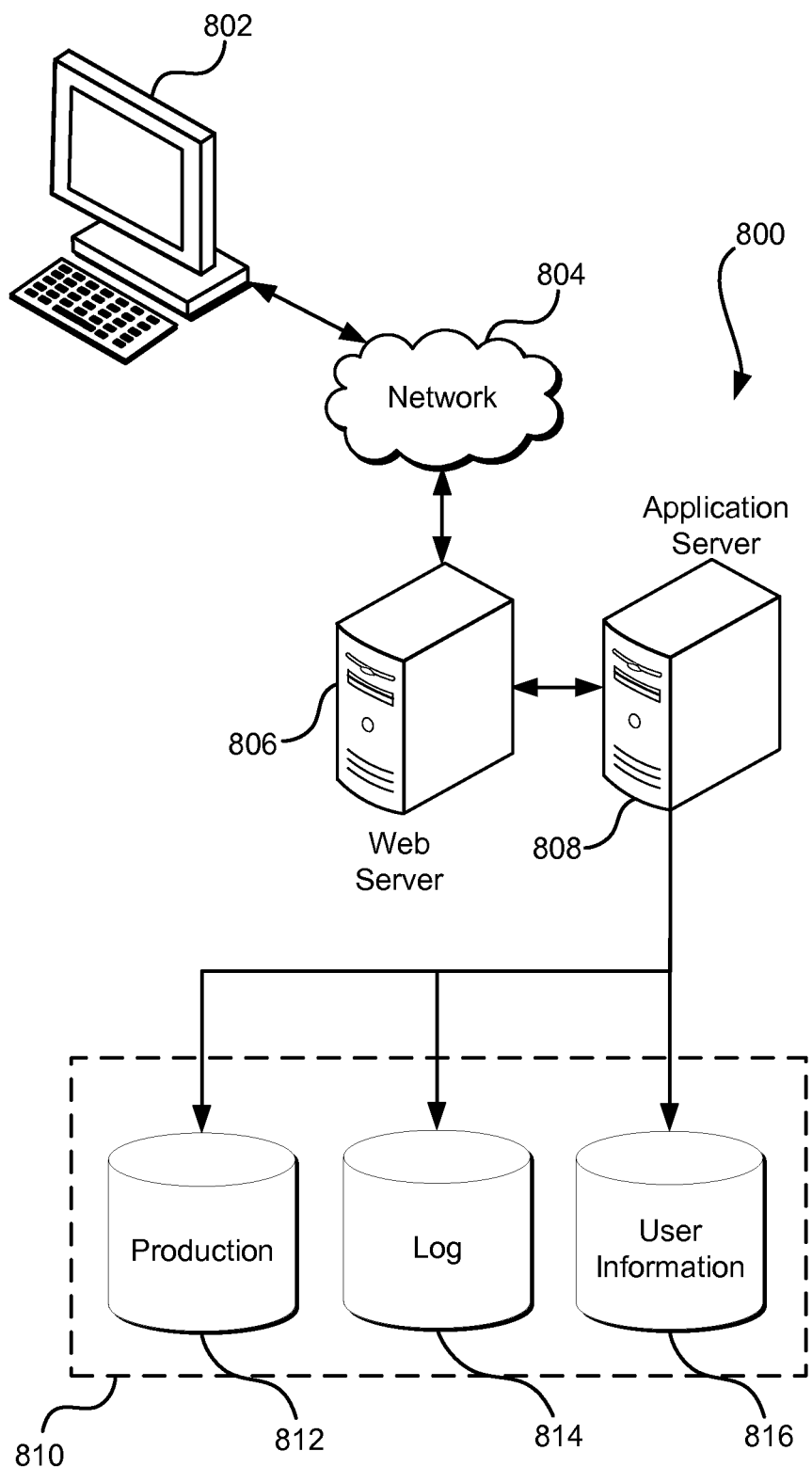
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN")

familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for query processing, comprising:
   under the control of one or more computer systems configured with executable instructions,
   receiving user input data;
   storing the input data in one or more storage nodes by at least:
      storing a first portion of the user input data in an append data store as a result of having insufficient computing capacity to perform one or more optimization operations;
      extracting a second portion of the user input data from the append data store and performing the one or more optimization operations on the second portion of the input data to create optimized data as a result of regaining sufficient computing capacity to perform the one or more optimization operations; and
      storing the optimized data in an optimized data store;
   receiving a user query and a completion threshold based at least in part on information generated by the user;
   performing a search for one or more records responsive to the user query, using a filter, on the optimized data store;
   obtaining sufficient records to satisfy the completion threshold by at least:
      if the search on the optimized data store obtained sufficient records to satisfy the completion threshold, returning a result of the search in response to the query; and
      if the search on the optimized data store did not obtain sufficient records to satisfy the completion threshold, performing a second search for the one or more records response to the user query, using the filter, on the append data store; and
   providing the one or more records.

2. The computer-implemented method of claim 1, wherein storing the first portion of the input data in the append data store further includes encoding the first portion of the input data to eliminate at least some redundancy in the first portion of the input data.

3. The computer-implemented method of claim 2, wherein extracting the second portion of user input data and performing the one or more optimization operations on the second portion of user input data further includes extracting the second portion of user input data, wherein at least a portion of the second portion of user input data includes the encoded first portion of the input data, and performing the one or more optimization operations based at least in part on current computing capacity of a storage optimizer, the storage optimizer configured to extract data and perform optimization operations.

4. The computer-implemented method of claim 1, wherein obtaining sufficient records to satisfy the completion threshold further includes transmitting one or more duplicate user queries to one or more remote storage nodes.

5. A system, comprising:
   one or more processors;
   one or more storage nodes comprising, a first storage node, the first storage node comprising a first data store and a second data store, the first data store comprising data items retrieved from and removed from the second data store and processed for storage in the first data store, the second data store comprising preprocessed data items stored in the second data store as a result of the system having insufficient computing capacity at a time of receiving the preprocessed data items to processed the data items; and
   memory with instructions that, when executed by the one or more processors, cause the system to:
      generate a filter based at least in part on one or more query terms included in a received user query;
      perform a first search for one or more data items responsive to the user query, using the filter, on the first data store;
      obtain sufficient data items to satisfy a threshold by at least:
         if the first search on the first data store obtained sufficient processed data items to satisfy the threshold, returning a result of the search in response to the query; and
         if the search on the first data store did not obtain sufficient processed data items to satisfy the threshold, performing a second search for the one or more data items in response to the user query, using the filter, on preprocessed data items contained in the second data store; and
      provide the one or more data items.

6. The system of claim 5, wherein the system further comprises a storage optimizer configured to extract data from the first data store, perform one or more packing operations and store packed data in the second data store.

7. The system of claim 5, wherein the memory further includes instructions that, when executed by the one or more processors, cause the system to:
   partition the user query into one or more partition queries; and
   transmit the one or more partition queries to one or more remote storage nodes of the one or more storage nodes.

8. The system of claim 5, wherein the first data store is encoded based at least in part on a negative look behind algorithm where the encoded data indicates a predecessor value sharing at least one redundant data value.

9. The system of claim 5, wherein the first data store is encoded based at least in part on a repetition counter where the encoded data includes a repetition value indicating a portion of a previous record to be repeated.

10. The system of claim 5, wherein the first data store is encoded based at least in part on a reuse counter where the encoded data include a reuse value indicating a number of redundant data values from a previous record.

11. The system of claim 5, wherein the memory further includes instructions that, when executed by the one or more processors cause the system to perform the second search for the one or more data items based at least in part on a run time threshold associated with the first search.

12. The system of claim 11, wherein the memory further includes instructions that, when executed by the one or more processors cause the system to receive from a user a work factor configured to reduce the run time threshold associated with the first search.

13. A non-transitory computer-readable storage medium having collectively stored thereon executable instructions that, when executed by one or more processors of a computer system, cause the computer system to at least:
receive a query and a value;
obtain responses to the query satisfying the value by at least:
performing a first search on a first data store, of a storage node, for one or more records responsive to the query, the first data store containing encoded data such that at least a portion of redundancy in data is removed to create the encoded data, the encoded data created as a result of the storage node having sufficient capacity to encode data obtained from a second data store of the storage node; and
if the search does not return sufficient responses to satisfy the value, performing a second search on the second data store, of the storage node, for the one or more records responsive to the query the second data store contacting data; and
return the one or more records.

14. The non-transitory computer-readable storage medium of claim 13, wherein the instructions that cause the computer system to obtain responses to the query satisfying the value further include instructions that cause the computer system to, if the second search does not return sufficient responses to satisfy the value, transmit one or more duplicate queries to one or more remote storage nodes.

15. The non-transitory computer-readable storage medium of claim 13, wherein the instructions further comprise instructions that, when executed by the one or more processors, cause the computer system to:
obtain a number records responsive to the query, of the one or more records responsive to the query, that exceeds the value; and
terminate, in response to obtaining sufficient responses to satisfy the value, at least one search for the one or more records responsive to the query.

16. The non-transitory computer-readable storage medium of claim 13, wherein the instructions further comprise instructions that, when executed by the one or more processors, cause the computer system to perform, at least, the search and the second search in parallel.

17. The non-transitory computer-readable storage medium of claim 13, wherein the instructions further comprise instructions that, when executed by the one or more processors, cause the computer system to perform one or more optimization operations on the first data store such that data stored in the first data store is converted to packed data.

18. The non-transitory computer-readable storage medium of claim 13, wherein the instructions further comprise instructions that, when executed by the one or more processors, cause the computer system to implement the second data store as an append-only data store.

19. The non-transitory computer-readable storage medium of claim 13, wherein the instructions further comprise instructions that, when executed by the one or more processors, cause the computer system to perform at least a partial encoding of the data in the second data store.

20. The non-transitory computer-readable storage medium of claim 13, wherein the instructions that cause the computer system to receive the query further include instructions that cause the computer system to receive the query at a front end, the front end configured to divide the query into one or more subparts and transmit the one or more subpart to the storage node and one or more remote storage nodes.

* * * * *